C. EDGAR.
Horse Hay-Rakes.
No. 142,844.  Patented September 16, 1873.
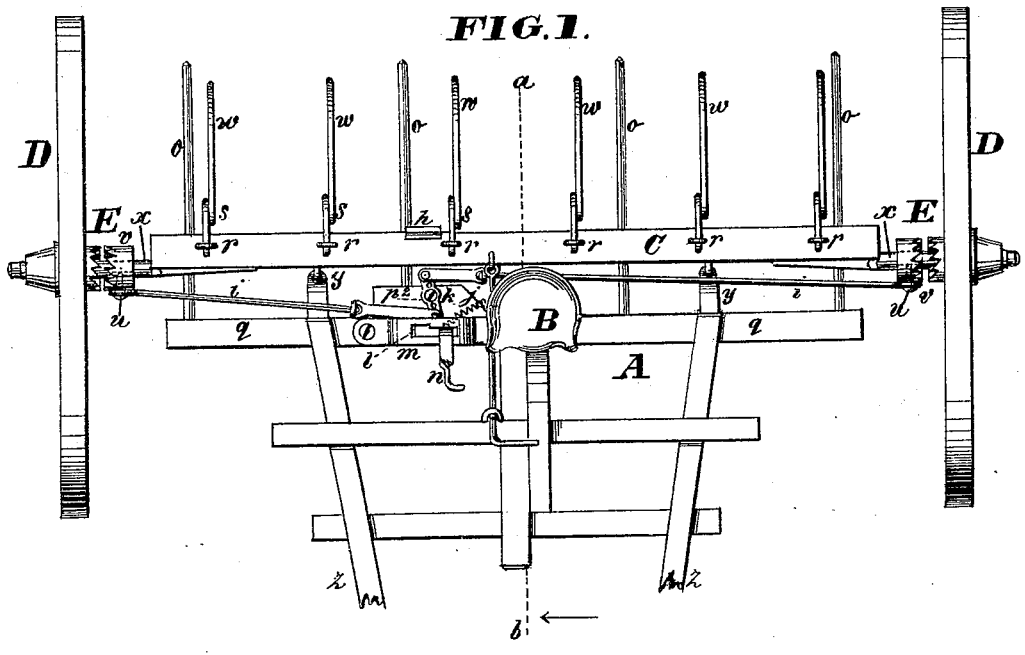
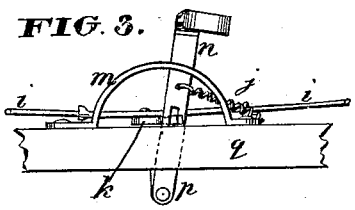
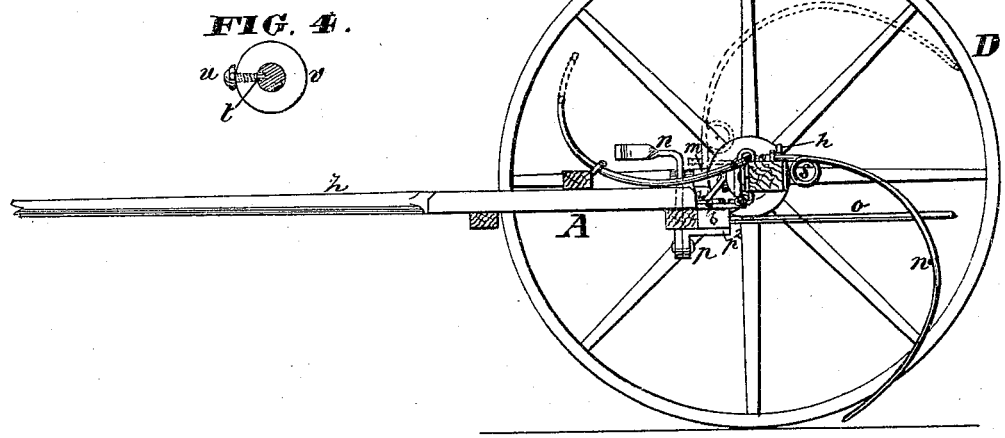
WITNESSES:  INVENTOR:

UNITED STATES PATENT OFFICE.

CHARLES EDGAR, OF DAYTON, OHIO.

IMPROVEMENT IN HORSE HAY-RAKES.

Specification forming part of Letters Patent No. 142,844, dated September 16, 1873; application filed August 18, 1873.

*To all whom it may concern:*

Be it known that I, CHARLES EDGAR, of Dayton, in the county of Montgomery, Ohio, have invented a new and useful Improvement in Horse Hay-Rakes, of which the following is a specification:

This invention relates to those spring-tooth horse hay-rakes the teeth of which are elevated at will to discharge the load, by being connected to the ground-wheels by means of clutches, the latter being automatically shifted to break the connection, when the teeth have been elevated to the requisite extent. The invention consists in a peculiar combination and arrangement of parts, by which a combined axle and rake-head is attached at both ends to the hubs of the ground-wheels, and automatically released therefrom, a single treadle and spring serving for all the parts.

Figure 1 is a plan view of a horse hay-rake, illustrating this invention. Fig. 2 is a vertical longitudinal section of the same on the line $a\ b$, Fig. 1. Fig. 3 is a partial front view on a larger scale. Fig. 4 is a similar end view of one of the clutches and a cross-section of that part of one of the axle-spindles on which the same works.

The pair of thills $z\ z$ of the improved rake or the draft-tongue forms a part of or is attached rigidly to a flat frame, A, of any approved construction, on which the driver's seat B is erected. The rear edge of this frame is attached by suitable hinge-joints $y$ to a combined axle and rake-head, C, which is furnished with axle-spindles $x$, and spring rake-teeth $w$. A pair of ground-wheels, D, furnished with hub-clutches E, are properly mounted on the axle-spindles $x$; the clutch-slides $v$ working freely into and out of mesh, and attached to the spindles, and through these to the axle and rake-head by set-screws $u$, working in longitudinal grooves $t$, or by equivalent means. The teeth of the clutches may be of any preferred shape and number. The rake-teeth are preferably constructed each with a single depressed coil, $s$, and attached by inturned extremities and staple-bolts $r$. The rear bar $q$ of the seat-frame A is extended in length, and furnished with brackets $p\ p^2$, to receive and support the clearer-fingers $o$, and the major mechanism for operating the clutch-slides. This consists of a loosely pivoted or elastic vertical treadle-lever, $n$, journaled in the bracket $p$; a broad sector-bar, $m$, mounted on the upper side of the frame-bar $q$, and slotted to receive the treadle-lever $n$, and furnished at one end with a notch, $l$, to retain the same; a horizontal lever, $k$, fulcrumed on the bracket $p^2$, and furnished with adjusting perforations; and a single spring, $j$, arranged so as to draw the treadle-lever both into the retaining-notch $l$ and into the opposite end of its guide-slot, the latter being its position when the clutch-slides are out of mesh. A pair of light rods or wires, $i$, preferably furnished with swivels, as shown, connect the clutch-slides to the horizontal lever $k$, and are attached to the latter, more or less, near its fulcrum, as required, by means of the perforations therein, so as to regulate the movement of the clutch-slides. The clutches are thrown into mesh at the will of the driver by pressing the treadle-lever $n$ laterally against a portion of the draft of the spring $j$, to the position of the retaining-notch $l$, into which it is drawn by the spring. Through the horizontal lever $k$ and connecting-rods or wires $i$ the first motion of the treadle-lever is transmitted to the clutch-slides. The further motion of the implement now operates to elevate the rake-teeth, the axle and rake-head revolving or rotating with the ground-wheels. For automatically releasing the rake-teeth and restoring them to their work, the rake-head is provided with a projection, $h$, which comes in contact with the treadle-lever at the proper moment, and forces it out of the retaining-notch $l$, when it is shifted by the spring so as to throw the clutches out of mesh. The rake-teeth may be held to their work by a treadle-bar, $g$, of suitable form, or any preferred substitute therefor.

The combination of hub-clutches, springs, connecting-rods, levers, a rack-bar, and means for shifting the lever automatically, broadly considered, is hereby disclaimed; as also the application of such mechanism, broadly considered, to horse-rakes for dumping or discharging the same, and automatically resetting the teeth.

The following is claimed as new, namely:

The single spring $j$ and the treadle-lever $n$ yielding in two directions, as described, in combination with the connecting-lever and rods or wires $k\ i\ i$, the sector-bar $m$ having a guide-slot provided with a retaining-notch, $l$, and the releasing-tappet $h$, arranged and operating substantially as herein set forth, for the purpose specified.

CHAS. EDGAR.

Witnesses:
OCTAVIUS KNIGHT,
JAS. L. EWIN.